United States Patent

[11] 3,590,716

[72] Inventor James S. Beattie
2810 Lansdowne Road, Victoria, British Columbia, Canada
[21] Appl. No. 735,597
[22] Filed June 10, 1968
[45] Patented July 6, 1971

[54] SHUTTER CONTROL ARRANGEMENT
6 Claims, 12 Drawing Figs.

[52] U.S. Cl. .................................................. 95/53, 95/11, 95/11.5
[51] Int. Cl. .................................................. G03b 9/00
[50] Field of Search .................................................. 95/49, 11, 58, 60, 66, 53

[56] References Cited
UNITED STATES PATENTS
1,971,435  8/1934  Wear .......................... 95/49
2,397,742  4/1946  Kals ........................... 95/49
1,221,063  4/1917  Lare ........................... 95/66 X
2,421,396  6/1947  Schwartz ....................... 95/66 X
2,533,800  12/1950 Hearn .......................... 95/60
3,092,002  6/1963  Frenk .......................... 95/58

Primary Examiner—John M. Horan
Assistant Examiner—T. A. Mauro
Attorney—Jack M. Wiseman ABSTRACT: An electrically controlled arrangement for a camera to position the shutter of the camera, wherein a switching device of an electrical control circuit is responsive to the positioning of a ground glass plate and film carrying structure, which are insertable in the rear portion of the camera, and wherein the structure activates the switching device to energize or deenergize a solenoid linked to the shutter for opening and closing the shutter in a predetermined sequence dependent upon the position of the switch activating structure.

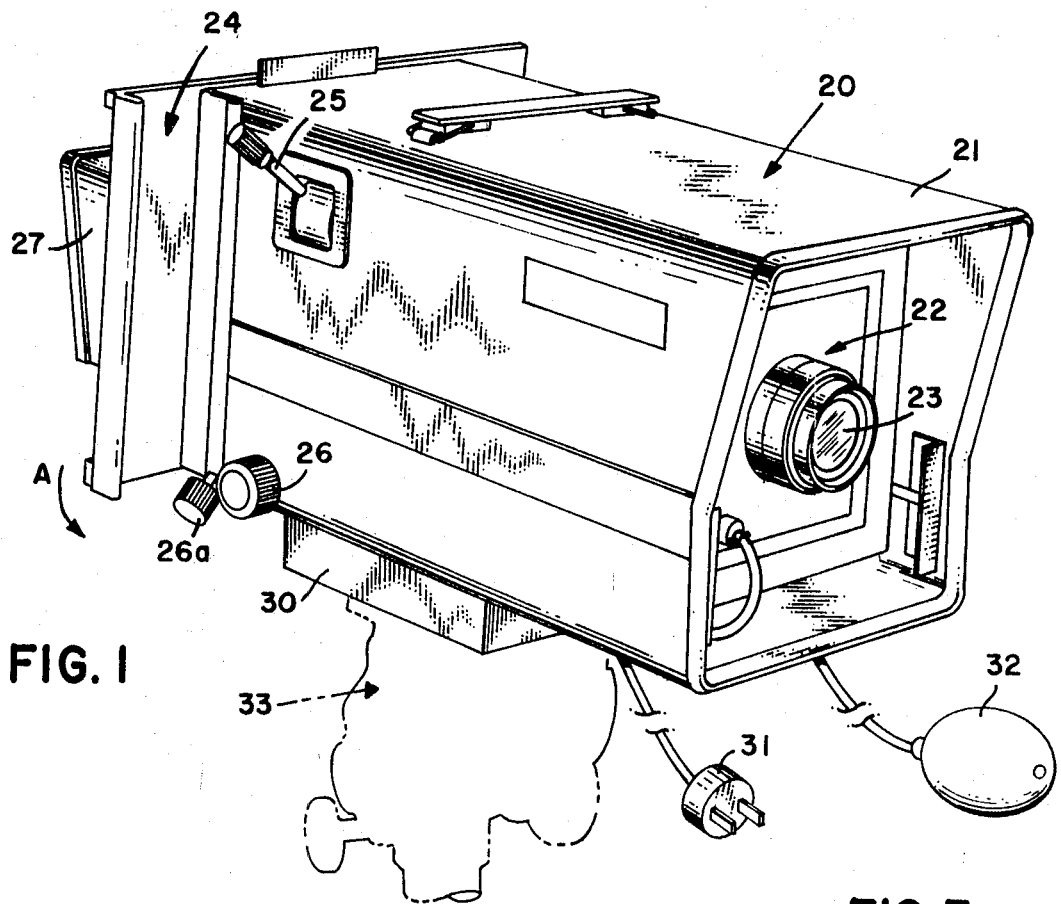
FIG. 1
FIG. 3
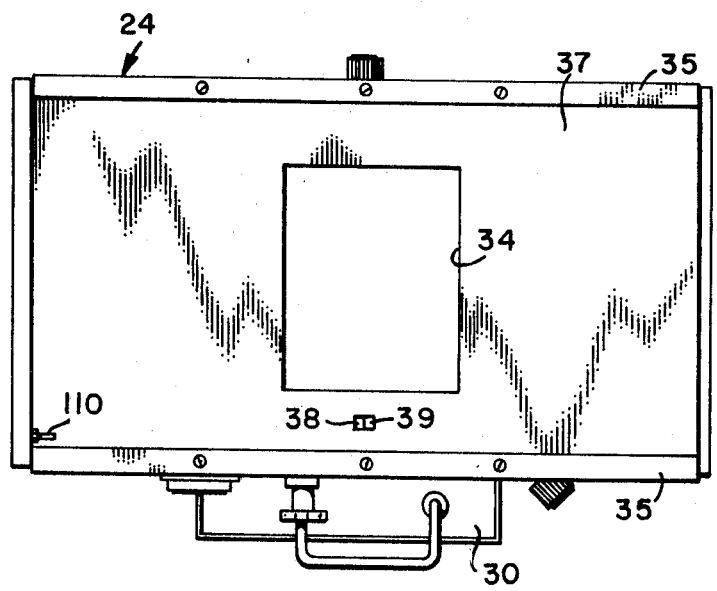
FIG. 2
INVENTOR
JAMES S. BEATTIE
BY Jack M. Wiseman
ATTORNEY

PATENTED JUL 6 1971　　3,590,716

INVENTOR.
JAMES S. BEATTIE

BY *Jack M. Wiseman*

ATTORNEY

PATENTED JUL 6 1971 3,590,716

INVENTOR.
JAMES S. BEATTIE
BY Jack M. Wiseman
ATTORNEY

INVENTOR.
JAMES S. BEATTIE
ATTORNEY

SHUTTER CONTROL ARRANGEMENT

BACKGROUND OF THE INVENTION

Time is usually an important factor in most operations, and often has a direct bearing on the profit to be realized from the operation. This is also true in photography, and, in particular, studio photography. Appointments are scheduled for picture taking sessions throughout the working day, and the more efficiently these sessions are handled the more business and profit for the photographer. Therefore, any simplification in the operation of the camera during these appointments can save the photographer time, and allows him to meet his appointments in a more timely fashion at a greater profit.

In taking photographs in a studio or on location with prior art equipment, the photographer must ordinarily set up his camera and arrange the subject or subjects to be photographed in front of the camera. Consideration, of course, must be given to the proper lighting and composition of the picture. It is common practice to inset a ground glass plate holder at the rear portion of the camera, so that the subject and composition thereof can be viewed on the ground glass plate, while the shutter is opened. At his time, the exposure and f-stop settings are ordinarily made. Satisfied with the image viewed on the ground glass plate, the photographer then inserts film in the ground glass plate holder at the rear of the camera so that the image previously viewed on the ground glass plate will be recorded on the film during the time the shutter is opened. The film is ordinarily protected from exposure by a metal slide plate, and the shutter must be closed when the metal slide plate is removed prior to taking a picture. Thus, the photographer must step up to the camera and close the shutter. When the shutter is closed, the metal slide plate is removed from over the film, and the camera is ready to take the picture of the subject when the conventional bulb-type switch is depressed or actuated. The photographer ordinarily must stand to one side of the camera so that he can watch the subject or subjects to know the exact moment to capture the picture on the film.

The photographer's concern with the open or closed position of the shutter has been alleviated by this invention and the automatic opening and closing of the shutter for the setting of the shutter has been achieved by this invention. Hence, the operation of the camera is automatic and more efficient.

SUMMARY OF THE INVENTION

In general terms, it is an object of the present invention to provide an electrical circuit for automatically controlling shutter position in accordance with positioning of a ground glass plate structure and film holder at the rear of a camera to reduce the concern and manipulation of the camera shutter by the photographer.

It is another object of the invention to provide a switching means in the electrical circuit that is actuated by a ground glass plate structure and film holder insertable in the camera to position the shutter in a predetermined manner to facilitate picture taking with the camera.

It is a further object of the invention to provide an improved electromechanical structure for a camera to facilitate the operation of the camera shutter to simplify picture taking with the camera.

It is still another object of the invention to provide a switching means movable to actuate a shutter in accordance with a condition existing at the rear portion of the camera insofar as a film holder means and film is concerned.

It is another object of the invention to provide simplified structure for a film holder means for automatically controlling shutter operation through an electrical circuit responsive to the film holder arrangement.

These and other objects will be apparent in the following description, and drawings, of which:

BRIEF DESCRIPTION OF THE DRAWINGS

FIG. 1 is a perspective view of a studio camera embodying the invention;

FIG. 2 is a rear elevation of the camera of FIG. 1;

FIG. 3 is a fragmentary side elevation of the camera of FIG. 2;

DESCRIPTION OF THE PREFERRED EMBODIMENT

Figure 4:
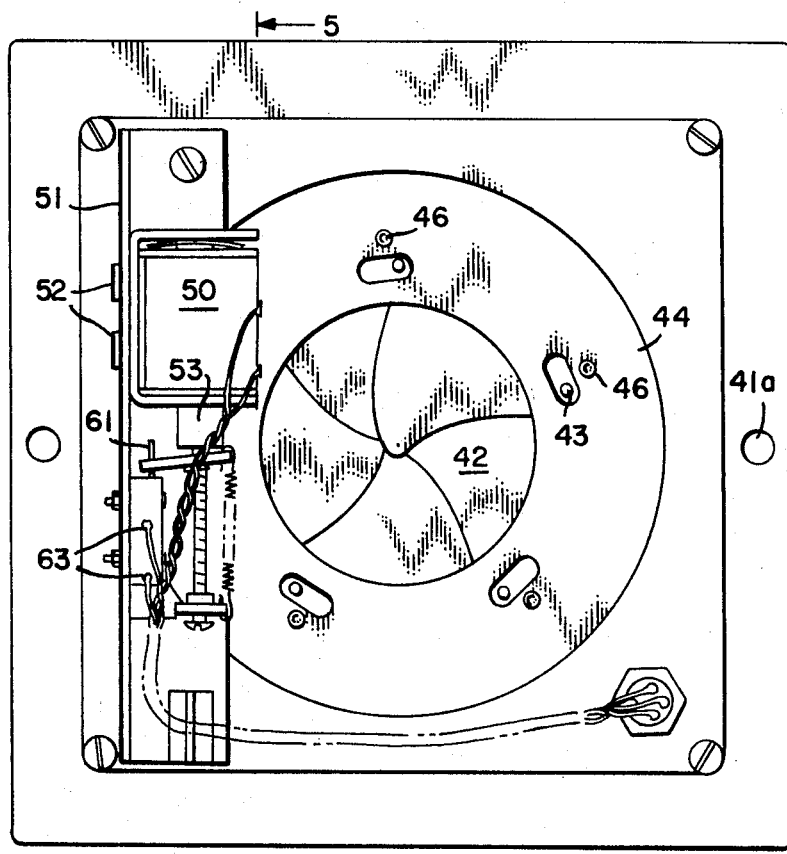
FIG. 4 is an elevation view of the shutter mechanism of the camera of FIG. 1.

Reference is made to FIG. 1 wherein a studio camera is designated generally by the numeral 20 and is shown mounted on a stand 33. A camera housing 21 includes a front portion 22 in which lens 23 and a shutter assembly 41 (FIG. 4) are supported, and a rear portion 24 for receiving a film holder and ground glass plate to be described in greater detail hereinunder. An f-setting for the lens 23 is adjusted by f-stop means 25, and a bellows (not shown) within the camera housing 21 is adjustable longitudinally of the housing by a knob 26. Provision is made for rotating the rear portion 24 about a central axis of the camera housing, and a knob 26a secures the rear portion 24 in the desired portion relative to the housing 21. When the knob 26a is loosened, the rear portion 24 may be swung in the direction of an arrow "A."

A hood structure 27 is provided on a film holder structure 36 (see FIG. 6) for viewing an image on a ground glass plate 28, and the film holder structure 36 is insertable at the rear portion 24 as will be hereinunder described in greater detail. Within an electrical housing 30 is an electrical control circuit 29 (FIG. 11), which is connected to a suitable source of electrical power through a conduit 31 from an electrical outlet (not shown). A bulb-type switch 32, well known in the art, is also connected to the control circuit 29 (FIG. 11) and is used to actuate a shutter assembly 41 for taking a picture.

Figure 9:
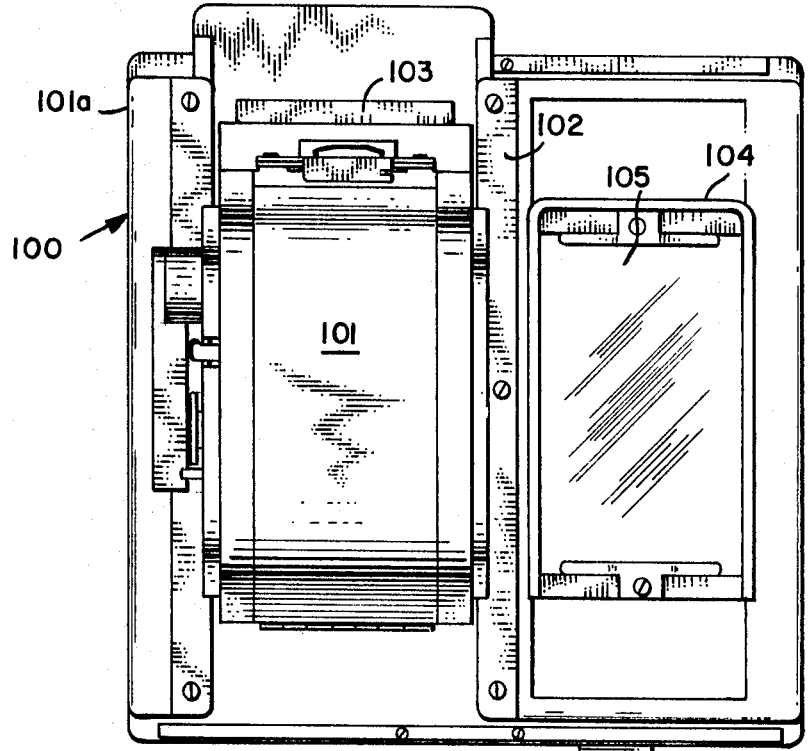
FIG. 9 is an elevation view of another film holder and ground glass plate structure for insertion in the camera of FIG. 2.

In FIG. 2, the rear portion 24 of the camera 20 is shown provided with an opening 34 that allows light passing through the lens 23 to impinge on a ground glass plate or film whichever is disposed rearwardly of the opening 34, while the shutter blades 42 of the shutter assembly 41 are open. The rear portion 24 is provided with flanges 35 for receiving either a split film holder structure 36 (FIG. 6) or a roll film holder structure 100 (FIG. 9). The split film holder structure 36 or the roll film holder structure 100, whichever is used, is allowed to move along and in frictional contact with a wall 37 in a contiguous relation. An opening 38 formed in the wall 37 allows a roller actuator 39 of a snap action switch, such as a microswitch 40, to extend therethrough. Through this arrangement, the split film holder structure 36 or the roll film holder structure 100, whichever is used, is inserted at the flanges 35 of the rear portion 24, and the film holder structure is slidably moved along the wall 37, and in so doing actuates or moves the roller actuator 39 of the switch 40 for controlling the position of the shutter blades 42.

The shutter assembly 41 is shown in FIG. 4 and is secured to the front portion 22 of the camera housing 21 by fasteners 41a. The construction of the shutter assembly 41 is conventional in that shutter blades 42 are pivoted to an open position about pivots 43 when a shutter ring 44 is rotated relative to a ring housing 45. The shutter blades 42 are pivotally connected to the shutter ring 44 by pins 46.

Figure 5:
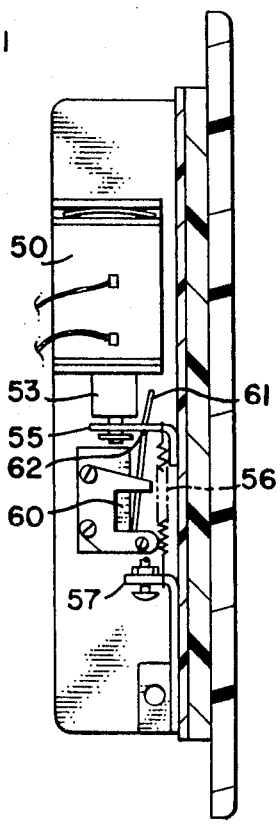
FIG. 5 is a sectional view partially in elevation taken along line 5-5 of FIG. 4.

In the exemplary embodiment of the present invention, a solenoid 50 is attached to a flange 51 by fasteners 52. Bracket 55 (FIG. 5) is secured to the shutter ring 44 and to an armature 53 of the solenoid 50. When the solenoid 50 is energized, the armature 53 retracts within the solenoid 50 to move the bracket 55, thereby moving the shutter ring 44 in a clockwise direction (as viewed in FIG. 4) to the open shutter blades 42. When the solenoid 50 is deenergized to expel the armature 53 outward therefrom, a spring 56 attached to the bracket 55 and to a fixed bracket 57 urges the shutter ring 44 to move in a counterclockwise direction (as viewed in FIG. 4) to close the shutter blades 42. The solenoid 50 is electrically connected to the control circuit 29 via suitable leads.

Also secured to the flange 51 is a snap-action switch 60 (FIG. 5) having an actuating member 61 extending through an opening 62 in the bracket 55. The actuating member 61 is bent (FIG. 5) so that movement of the bracket 55 by the armature 54 causes the opening and closing of the switch 60. The switch 60 is connected to the electrical circuit 29 by leads 63.

The structure of the shutter assembly 41 and the rear portion 24 of the camera 20 has now been described. A description will now be made of the structure for loading film into the camera 20 and for providing a ground glass plate for viewing an image of a subject prior to the actual picture taking. Ground glass viewing of an image prior to placing film in a camera is well known in the art, and certain portions of the structure for loading the film into the camera are also well known, but other structure will be described in conjunction with the preferred embodiment.

Figure 6:
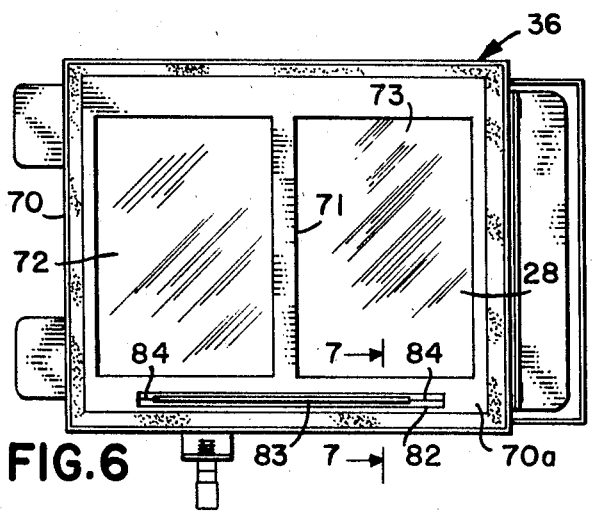
FIG. 6 is an elevation view of a film holding and ground glass plate structure for insertion in the camera illustrated in FIG. 1 at the rear thereof shown in FIG. 2.

In FIG. 6, the film holder structure 36 with provision for a ground glass plate 28 is shown as having a frame 70 provided with a dividing strip 71 to form two image receiving areas 72 and 73. The ground glass plate 28 is disposable within the frame 70, and when the shutter blades 42 are open, an image may be seen through the ground glass plate 28, as is well known in the art. Thus, the photographer is able to view the image that the film will record when the film is exposed during the taking of the picture. A conventional film pack 80 (FIG. 8) is insertable within the film holder structure 36 between the frame 70 and a hood frame 81. The film pack 80 is provided with conventional metal slide plates that can be removed from the film pack so that the film can be exposed.

In a lower portion of the frame 70 (FIG. 4) a horizontally disposed slotted opening 82 is formed along the lower section thereof. Located within the slotted opening 82 is a movable member 83 supported by resilient wire members 84. Normally, the resilient wire members 84 urge the movable member 83 rearwardly of the frame 70, as viewed in FIG. 7. When the movable member 83 is so urged, a recessed area "R" is formed along the slotted opening 82 for receiving the roller actuator 39 of the switch 40.

It should be noted that the slotted opening 82 (FIG. 6) is alignable with the opening 38 (FIG. 2) upon insertion of the frame 70 in the rear portion 24 of the camera along the flanges 35 and flush with the wall 37. The surface 70a (FIG. 8) of the frame 70 is positioned so that the slotted opening 82 is directly behind the opening 38. When the slotted opening 82 is directly behind the opening 38, the roller actuator 39 is urged into the recessed area R to actuate the switch 40. The roller actuator 39, in the preferred embodiment, is normally urged to extend beyond the wall 37 through the opening 38 (FIG. 3). Thus, the slotted opening 82 with the attendant recessed area R allows the roller actuator 39 to project beyond the wall 37 when the frame 70 is in position for viewing through the ground glass plate 28.

Figure 8:
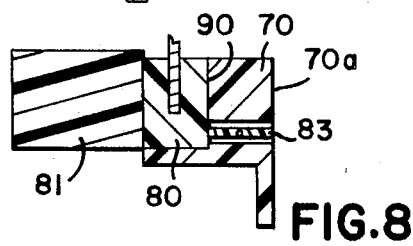
FIG. 8 is a view similar to FIG. 7 but with the film inserted therein.

The shutter blades 42 are normally open when the roller actuator 39 of switch 40 is extending beyond the wall 37. The image can then be viewed on the ground glass plate 28 by the photographer. With the control circuit 29 operating to energize the solenoid 50, the shutter blades 42 open automatically for ground glass viewing as the roller actuator 39 extends into the opening 82. Inserting the film pack 80 into the frame 70 in a conventional manner causes a surface 90 (FIG. 8) of the film pack to engage the movable member 83 to move the movable member 83 into the recessed area R until the edge thereof is substantially flush or aligned with the surface 70a of frame 70 (FIG. 8). Thus, the movable member 83 now contacts the roller actuator 39 to position it toward the switch 40. It is this movement of the roller actuator 39 that results in the deenergization of solenoid 50, and the shutter blades 42 being closed.

Figure 7:
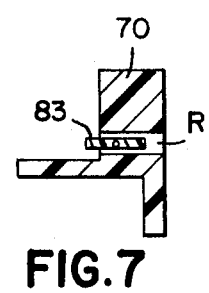
FIG. 7 is a sectional view taken along line 7-7 of FIG. 6.

Thus, it can be seen that the initial insertion of the frame 70 first depresses the roller actuator 39 until the slotted opening 82 is directly behind the opening 38 to allow the roller actuator 39 to assume its initial condition by extending into recessed area R (FIG. 7). This action causes the control circuit 29 to energize the solenoid 50 for opening the shutter blades 42 and the image may be viewed on the ground glass plate. When the film pack 80 is inserted into the frame 70, the movable member 83 is urged outwardly by the film pack 80 to depress the roller actuator 39 to deenergize the solenoid 50 through the switch 40. This action causes the shutter blades 42 to close, and the camera is now ready for picture taking by the closing of bulb-switch 32.

Figure 10:
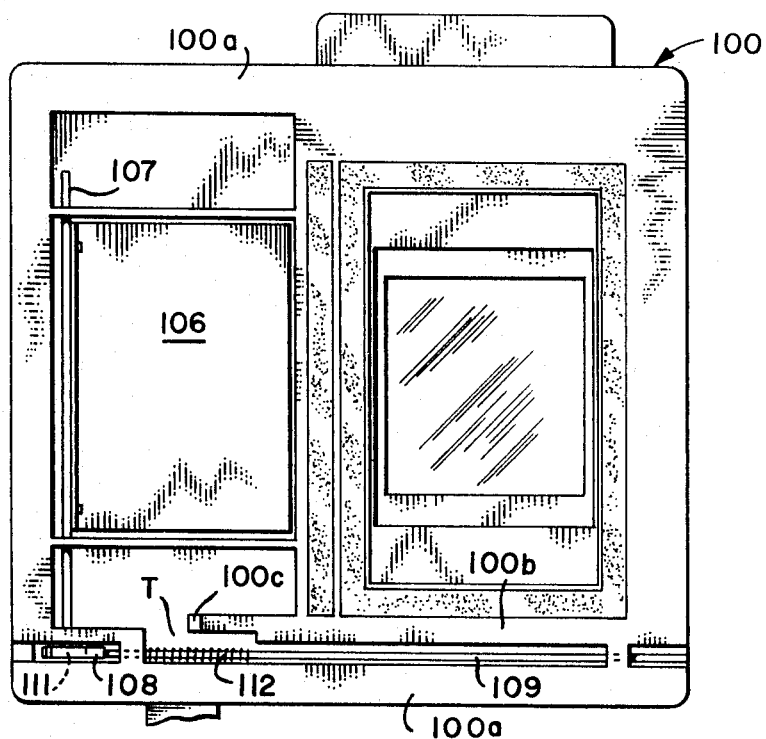
FIG. 10 is an elevation view of the structure of FIG. 9 as seen from the interior of the camera; and, FIG. 11 is a schematic diagram of an electrical circuit for controlling the shutter of the camera shown on FIG. 1.

In FIGS. 9 and 10 the roll film holder structure 100 and ground glass plate is shown having a frame 100a. A film holder 101 contains, for example, a film designated as 120 film, and is slideably mounted on the holder structure 100 by flanges 102. A metal plate 103 is provided for protecting the exposed surface of the film directed toward the lens of the camera 20. Adjacent the film holder 101 (FIG. 9) is a hood structure 104 which aids in viewing an image on a ground glass plate 105 supported in the frame 100a. The film holder structure 100 is adapted to slideably engage the rear portion 24 of the flanges 35 for positioning at the rear of the camera 20 behind the opening 34 for ground glass plate viewing and picture taking. The wall on the frame 100a engages the wall 37, thereby preventing light from entering between the frame 100a and the wall 37. For ground glass plate viewing, the ground glass plate 105 is positioned behind the opening 34, and with the shutter blades 42 in the open position, the image is viewable through the glass plate 105. Then, the film holder 101 is moved behind the opening 34, and the metal plate 103 is removed so that a picture can be taken by actuating the bulb switch 32.

As seen in FIG. 10, a metal door 106 is in position behind the ground glass plate 105 and is supported on a hinge member 107. The metal door 106 is caused to open by the movement of a rack 108 acting on a pinion 111, which is secured to the hinge member 107. The rack 108 is moved by a member 109, when it strikes a member 110 (FIGS. 2 and 3) mounted on the rear portion 24 for opening the metal door 106 to reveal the glass plate 105 and making it available for viewing. A spring 112 urges the metal door 106 to a closed portion over the glass plate 105, when the member 109 is moved away from the member 110.

Above and adjacent to the member 109 is a frame portion 100b that is alignable with the opening 38 of the rear portion 24 and the roller actuator 39 of the switch 40. As the frame 100a is moved behind and along the wall 37, the frame surface 100b depresses the roller actuator 39. The frame surface 100b terminates at 100c (FIG. 10), and forms a recess T, and when the roller actuator 39 is under recess T, it returns to its initial portion. Thus, the switch 40 is actuated by the actuating 39 in much the same fashion as was described in conjunction with FIGS. 6, 7, and 8.

The frame 100a is thereby provided with a portion 100b that acts to depress the roller actuator 39, and another portion of the frame, recess T, allows the roller actuator 39 to return to its initial position. This actuation of the switch 40 by the movement of the roller actuator 39 in accordance with the position of the holder 101 aids in taking photographs with the camera 20, as will be described in conjunction with the electrical control circuit 29 of FIG. 11.

Figure 11:
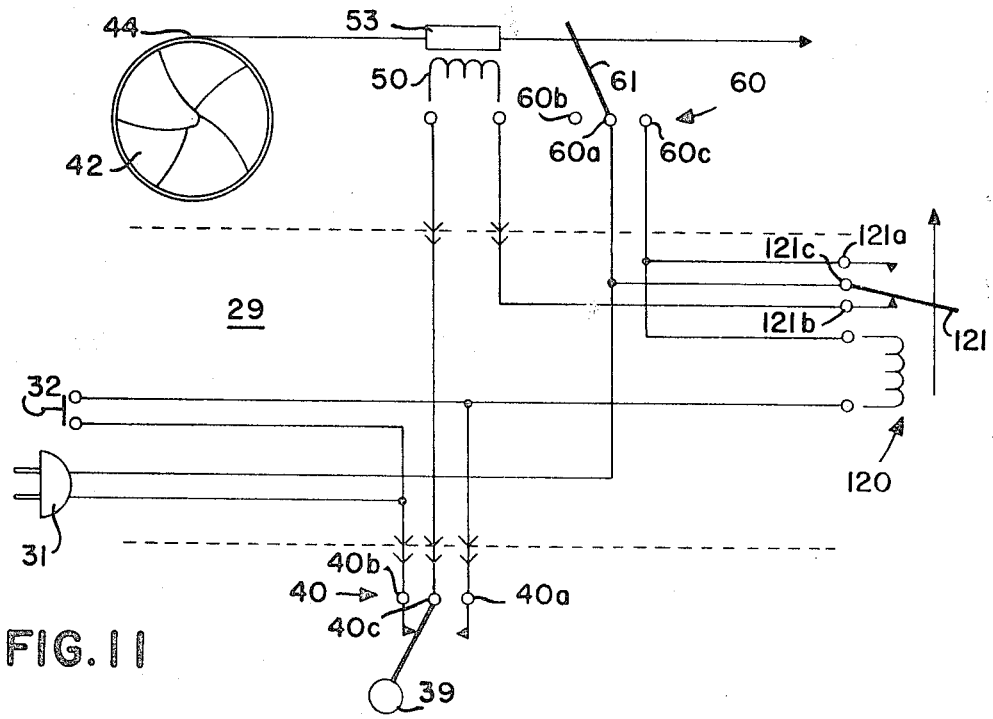

Reference is now made to FIG. 11, which shows the electrical control circuit 29 as diagrammatically connected to the shutter blades 42 and the ring 44 through the armature 53. The armature 53 also positions the actuator 61 of the snap-action switch 60. The bulb-type switch 32 is shown in the circuit 29, as well as the switch 40 and a relay 120.

The circuit 29 has a power input at an electrical plug 31, which is connected to the switch 40, the bulb switch 32, the snap-action switch 60, and the relay 120. The switch 40 has its contacts 40b normally closed. Contacts 40c are common contacts for the switch 40. When the contacts 40b are closed, the circuit 29 is operated to energize the solenoid 50 to move the armature 53 to the right (as viewed in FIG. 11), and at the same time the actuator 61 of the snap-action switch 60 is moved from contact 60b to 60c. Thus, it can be seen that when the roller actuator 39 of the switch 40 rests on the contacts 40b the solenoid 50 is energized to cause shutter blades 42 to open over the following path: plug 31, contacts 40b, contacts 40c, solenoid 50, contacts 121b, armature 121, contacts 121c and back to the plug 31.

The roller actuator 39, when depressed, moves as described hereinabove, from the contacts 40b of the switch 40 to the contacts 40a. As a consequence thereof, the solenoid 50 is not energized and the shutter blades 42 are in a closed position. When the roller actuator 39 is depressed to move to the contacts 40a and the bulb switch 32 is closed by the photographer, the solenoid 50 is thereby energized in the first instant to open the shutter blade 42 over the following path: plug 31, switch 32, contacts 40a, contacts 40c, solenoid 50, contacts 121b, armature 121, contacts 121c and back to the plug 31. In the next instant, as the actuator 61 of the snap-action switch 60 moves to the contact 60c, the relay 120 is energized over the following path: plug 31, switch 32, relay 120, contacts 60c, contacts 60a and back to the plug 31. Energization of the relay 120 moves the armature 121 from the contact 121b to the contacts 121a, thus opening the energizing path for the solenoid 50 to deenergize the solenoid 50 for closing the shutter blades 42. In the interval between the opening and the closing of the shutter blades 42 through the action of depressing the bulb switch 32, by the photographer, the film is exposed.

The operation of the circuit 29 in conjunction with the camera 20 and the film holding structure of FIGS. 6, 9 and 10 respectively will now be described. The holder 36 of FIG. 6 is inserted on the back portion 24 of the flanges 35, During the initial movement of the frame surface 70a along the wall 37, the roller actuator 39 is depressed to move from the contacts 40b to the contacts 40a. In other words, when the circuit 29 is operated, the switch 40 is in its normal position with the contacts 40b closed to energize the solenoid 50, over a previously described path for the opening of the shutter blades 42. Therefore, the leading portion of the frame 70 depresses the roller actuator 39 to open the contacts 40b for deenergizing the solenoid 50, in a manner previously described, thereby closing the shutter blades 42. Continued sliding movement of the frame 70 along the wall 37 brings the recess R over the roller actuator 39 and allows the actuator 39 to return to its initial position for the closing of the contacts 40b. This action causes the solenoid 50 to be energized, thereby opening the shutter blades 42.

With the shutter blades open, an image may be seen on the ground glass plate 28. Composition of the picture is revealed as an image on the ground glass plate, and a film pack 80 is inserted into the holder 36. The insertion of the film pack 80 moves the movable member 83 into the recess area R, and into contact with the actuator 39 to move the actuator 39 to close the contacts 40a, thereby deenergizing the solenoid 50 to close the shutter blades 42. The metal plate can be removed from the front of the film and the photographer is ready to take the picture, after, of course, making the proper f-stop setting and the like.

By squeezing the bulb switch 32, the shutter blades 42 are opened by the action of the armature 52, but the switch 60 is also actuated to move the armature 61 from the contacts 60b to the contacts 60c. As a result thereof, the relay 120 is operated to cause the armature 121 to move from the contacts 121b to the contacts 121a, thereby deenergizing the solenoid 50 in a manner previously described to close the shutter blades 42 again. The release of the bulb switch 32 returns the relay 120 to its initial condition. The picture is taken between the opening and closing sequence of the shutter blades, resulting from the actuation of the bulb switch 32, and the next film may then be used in the same manner for another picture, or if the entire film pack is taken out, the image is again viewable on the ground glass plate 28 for a new subject of the like.

The operation of the camera 20 with respect to the film holder structure 100, which is described in conjunction with the film holder 101, will now be considered. The insertion of the frame 100a depresses the roller actuation 39 when the recess T of the frame 100a is positioned over the actuator 39. When the actuator 39 returns to its initial position to close the contacts 40b, the solenoid 50 is energized in a manner previously described for opening the shutter blades 42. As the frame 100a abuts against the member 110, the door plate 106 is swung over to reveal an image on the ground glass plate 105. Once the photographer is satisfied with the image seen on the ground glass plate 105, he slides the frame 100a over until the film holder 101 is aligned over the opening 34. This causes the roller actuator 39 to be depressed to close the contacts 40a and the shutter blades 42 are thereby closed by the deenergization of the solenoid 50.

By removing the metal plate 103 from the film holder 101, the film is now ready to be exposed when the shutter blades 42 are opened. Depressing the bulb switch 32 first opens the shutter blades 42 and then closes them as described hereinabove. Thus, a picture has been taken by the exposure of the film. The film may be advanced as the shutter blades 42 are closed and the camera is ready for another picture. Or if it is desired to look through the ground glass plate again, the frame 100a is slideably moved along the wall 37 until the ground glass plate is behind the opening 34 for further viewing. Then the film holder 101 is moved over the opening 34 for taking the picture as set out hereinabove.

Figure 12:
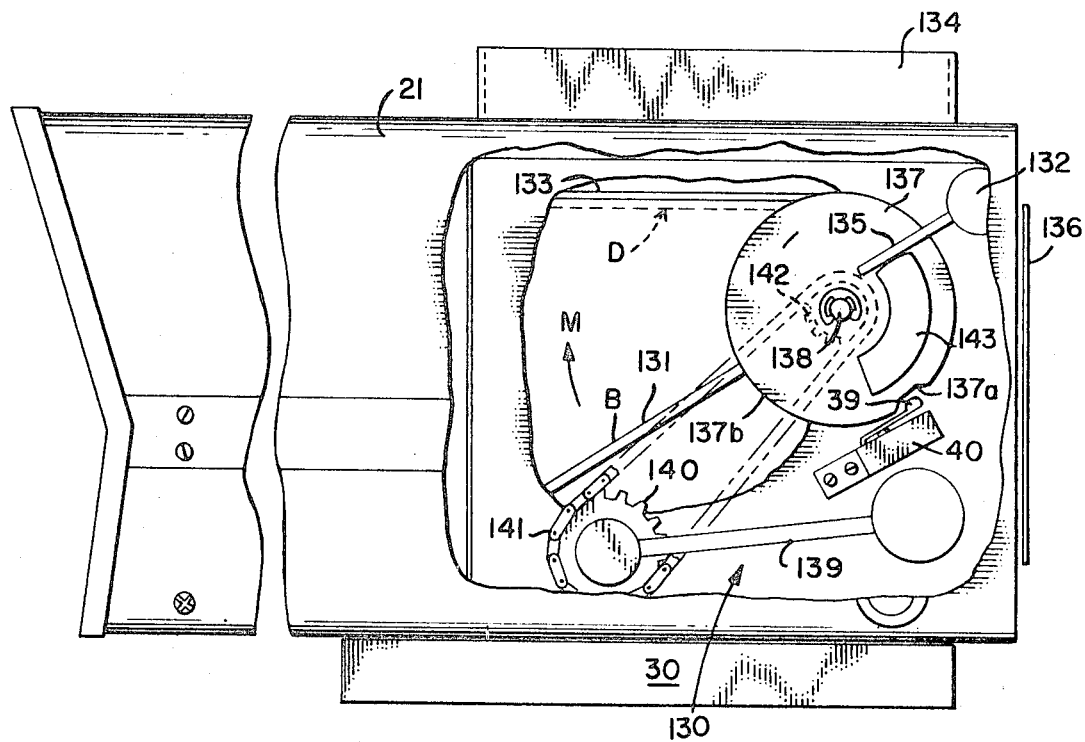
FIG. 12 is an elevation view in partial breakaway showing another modification of the shutter control arrangement.

In FIG. 12 a reflex unit 130 is shown mounted within the camera housing 21. In a single lens reflex camera, the image is reflected by a mirror to a ground glass plate for viewing. Then, the mirror is moved to cover the ground glass plate and the image is directed onto a film for exposure. In the reflex unit 130, a mirror 131 is mounted on a pivot member 132. With the mirror 131 in position B an image is reflected separately (as viewed in FIG. 12) onto a ground glass plate 133. Thus, the image is viewable through a hood 134. When the viewing is completed, the mirror 131 is swung by a lever 135 through substantially 45° as indicated by an arrow M until the mirror 131 is in a position D covering the bottom surface of the ground glass plate 133. Hence, the mirror 131 being disposed in position D no longer obstructs the path between the lens and a film holder 136 and the film of the film holder 136 is ready to be exposed.

In the preferred embodiment, a cam 137 is mounted for rotation on a spin 138, which is secured to the housing 21. The cam 137 is rotated by moving a lever 139 in a direction to rotate a sprocket 140, which in turn drives a chain 141 to rotate a sprocket 142. The sprocket 142 is secured to the cam 137 to impart rotation thereto. The cam 137 is formed with a raised portion 143 for engaging a mirror pivot lever 135 which is connected to the pivot member 132. As the cam 137 is rotated in a counterclockwise direction (as viewed in FIG. 12) the lever 135 is engaged by the raised portion 143 to move the lever 135 upwardly. Since the mirror 131 and the lever 135 are secured to the pivot member 132, the mirror 131 is moved upwardly until the movement is stopped at the underside of the ground glass plate 133.

The outer periphery of the cam 137 is indented as at 137a, and the cam 137 is positioned so that the indentation 137a is above and adjacent to the roller actuator 39 of the switch 40 when the mirror 131 is in position to reflect the image onto the ground glass plate 133. The roller actuator 39 and the switch 40 are connected in the control circuit 29 (FIG. 11) as hereinabove described. Thus, with the indentation 137a behind the roller actuator 39, the actuator 39 positions the switch 40 for the closure of the contacts 40b to energize the solenoid 50 to open the shutter blades 42. As the mirror 131 is pivoted to the underside of the ground glass plate 133 by the lever 139, the cam 137 is rotated so that the edge 137b thereof engages and depresses the roller actuator 39 to position the switch 40 for the closure of the contacts 40a to deenergize the solenoid 50, thereby closing the shutter blades 42. The mirror 131, in position D prevents light from entering the interior of housing 21 through the ground glass plate 133, and only light admitted through the lens 23 will strike the film of the film holder 136 when the shutter blades 42 are opened by the closing of bulb switch 32, as hereinabove described in conjunction with the control circuit 29. By moving the cam 137 in a clockwise direction (as viewed in FIG. 12) through the actuation of the lever 139, the mirror 131 can again be brought into image reflecting position B.

Thus, a camera has been described having an electrical control circuit for controlling shutter operation with several types of film holding structures selectively disposed at the rear of the camera. In each instance, an arrangement has been provided which coacts with the electrical control circuit to first have the shutter in open position for ground glass plate viewing, and subsequently to have the shutter closed and opened for a prescribed time when it is desired to take a picture by exposing the film. These shutter operations facilitate the taking of pictures by the photographer since the photographer does not have to manually open or close the shutter prior to picture taking for the shutter operation up to the point of picture taking is controlled entirely by the coaction of the shutter control arrangement. The operation of the electrical circuit also occurs when the bulb switch is closed by the photographer, and the shutter sequence is controlled by the electrical circuit during picture taking with the camera.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

What I claim is:

1. A shutter control arrangement for a camera comprising a shutter, solenoid means connected to said shutter for opening and closing said shutter, switching means electrically connected to said solenoid means for controlling the energization thereof, said switching means being supported at a rear portion of said camera, film holding means supported for movement at said rear portion of said camera to actuate said switching means for controlling the energization of said solenoid means to open and close said shutter, said film holding means includes a ground glass plate section and a film pack section, said ground glass section being formed with a portion thereof adapted to control the actuation of said switching means to control the energization of said solenoid means for opening said shutter to view an image through said ground glass plate section, said film pack section being formed with a portion adapted to control the actuation of said switching means for controlling the energization of said solenoid means to close said shutter, a film exposing switch connected to said solenoid means for controlling the energization of said solenoid means to open said shutter for enabling film to be exposed, a snap-action switch attached to said solenoid means to be actuated by the operation of said solenoid means, and a relay operatively controlled by the actuation of said snap-action switch to control the energization of said solenoid means for closing said shutter.

2. A shutter control arrangement for a camera comprising a shutter, solenoid means connected to said shutter to open and close said shutter, switch means connected to said solenoid means, said switch means being supported interiorly of said camera, switch actuating means supported interiorly of said camera and adapted to engage and disengage said switch means, whereby disengagement with said switch means energizes said solenoid means to open said shutter and engagement with said switch means deenergizes said solenoid means to close said shutter, said switch actuating means being a cam having an edge for engaging said switch means and a portion for disengaging said switch means, and a mirror positioned by said cam so that when said mirror is in a first position the switch means energizes said solenoid means to open said shutter and when said mirror is in a second portion the switch means deenergizes the solenoid means to close said shutter.

3. A shutter control arrangement for a camera comprising a shutter, a solenoid connected to said shutter for controlling the opening and closing thereof, a circuit connected to said solenoid for controlling the energization thereof, a shutter control switch connected to said circuit for controlling the energization of said solenoid, film holding means movable along a path adjacent to said shutter control switch, said film holding means being formed with an image viewing section and a film advancing section, said image viewing section being arranged to actuate said shutter control switch for operating said solenoid to open said shutter for viewing an image through said image viewing section, said film advancing section being arranged to actuate said shutter control switch for operating said solenoid to close said shutter, and a film exposure switch connected to said circuit for controlling the energization of said solenoid to open and close said shutter.

4. A shutter control arrangement as claimed in claim 3 wherein said film holding means is adapted to hold a split film.

5. A shutter control arrangement as claimed in claim 3 wherein said film holding means is adapted to hold a roll of film.

6. A shutter control arrangement as claimed in claim 3 wherein said circuit includes means operatively controlled by the operation of said solenoid for switching control over the operation of said solenoid between said shutter control switch and said film exposure switch.